United States Patent
Todd

(10) Patent No.: US 11,012,426 B2
(45) Date of Patent: May 18, 2021

(54) SECURE DATA POOLS

(71) Applicant: EMC IP Holding Company LLC, Hopkinton, MA (US)

(72) Inventor: Stephen J. Todd, Center Conway, NH (US)

(73) Assignee: EMC IP Holding Company LLC, Hopkinton, MA (US)

(*) Notice: Subject to any disclaimer, the term of this patent is extended or adjusted under 35 U.S.C. 154(b) by 207 days.

(21) Appl. No.: 16/206,438

(22) Filed: Nov. 30, 2018

(65) Prior Publication Data

US 2020/0177560 A1 Jun. 4, 2020

(51) Int. Cl.
*H04L 29/06* (2006.01)
*H04L 29/08* (2006.01)
*G06F 21/60* (2013.01)
*H04L 12/66* (2006.01)

(52) U.S. Cl.
CPC ........ *H04L 63/0435* (2013.01); *G06F 21/602* (2013.01); *H04L 12/66* (2013.01); *H04L 67/1042* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 2006/0026164 A1* | 2/2006 | Jung | G06F 16/00 |
| 2008/0162486 A1* | 7/2008 | Bells | G06F 16/275 |
| 2016/0205106 A1* | 7/2016 | Yacoub | H04W 12/04033 726/28 |
| 2016/0261411 A1* | 9/2016 | Yau | G06F 21/445 |
| 2019/0174207 A1* | 6/2019 | Cella | G08C 15/00 |

OTHER PUBLICATIONS

Satoshi Nakamoto, "Bitcoin: A Peer-to-Peer Electronic Cash System," http://bitcoin.org/bitcoin.pdf, 2008, 9 pages.
Juan Benet, "IPFS—Content Addressed, Versioned, P2P File System," arxiv.org/abs/1407.3561, 2014, 11 pages.
M. Ali et al., "Blockstack: A Global Naming and Storage System Secured by Blockchains," Proceedings of the Annual USENIX Technical Conference (USENIX ATC), Jun. 22-24, 2016, pp. 181-194.
U.S. Appl. No. 15/660,385, filed in the name of Stephen Todd et al. on Jul. 26, 2017 and entitled "Decentralized Identities for Access to Multiple Computing Resource Systems."

* cited by examiner

*Primary Examiner* — Andrew J Steinle
(74) *Attorney, Agent, or Firm* — Ryan, Mason & Lewis, LLP

(57) ABSTRACT

Techniques for secure data management in a sensor data environment are provided. For example, a method obtains sensor data, at a gateway, generated by at least one sensor associated with a set of one or more sensors operatively coupled to the gateway. The method generates at least one data object comprising the sensor data and metadata corresponding to the sensor data, and sends the data object to a secure data pool for storage and for secure access by one or more clients.

20 Claims, 14 Drawing Sheets

200

400

1000

1300

SECURE DATA POOLS

FIELD

The field relates generally to information processing systems and, more particularly, to secure data management in such information processing systems.

BACKGROUND

Information technology (IT) is typically understood to refer to systems and processes, including hardware and software, that an enterprise uses to process and store its data. On the other hand, operational technology (OT) typically refers to systems and processes that detect or cause a change through the monitoring and/or control of physical devices, processes and events in the enterprise. Thus, as compared to the term IT, the term OT is used more in an industrial sense and typically refers to direct monitoring and control or actuation of physical devices. Such devices are often part of systems referred to as Industrial Control Systems (ICS) or Supervisory Control and Data Acquisition (SCADA) systems. Therefore, such devices may, for example, monitor and transmit data (e.g., sensors, meters, etc.), and respond by actuating controlling devices (e.g., actuators such as gates, motors, etc.) to perform the functions involved in an industrial activity.

The convergence of IT and OT has resulted in a "data gap" that often prevents parties in these two technology environments from working together to share operational data (e.g., from sensors, devices, programmable logic controllers, etc.) and expose actuators to business-critical control.

There is a general reluctance by corporate OT departments to share data and processes with an IT organization. A primary reason is a concern that new IT operations and processes would cause costly downtime for the company. Furthermore, integration of IT operations and processes into OT operations and processes raises security considerations. This is due, at least in part, to the fact that OT systems may not be designed for IT processes such as, but not limited to, remote accessibility (e.g., enabling IT personnel or an IT system to remotely access an OT system). As such, security risks associated with remote accessibility were never considered. As a result of such vulnerability in OT systems, corporations and their critical infrastructure are at risk of industrial espionage and sabotage.

Accordingly, IT/OT convergence presents significant challenges to enterprises as well as to any entities that are faced with integrating IT and OT systems and processes.

SUMMARY

Embodiments of the invention provide techniques for secure data management in a sensor data environment.

For example, in one embodiment, a method obtains sensor data, at a gateway, generated by at least one sensor associated with a set of one or more sensors operatively coupled to the gateway. The method generates at least one data object comprising the sensor data and metadata corresponding to the sensor data, and sends the data object to a secure data pool for storage and for secure access by one or more clients.

In further embodiments, the metadata in the data object comprises data descriptive of the nature of the sensor data, and data indicative of the ownership of the sensor data. The data indicative of the ownership of the sensor data may comprise a decentralized identifier. The method may further digitally sign the data object with a private cryptographic key of the owner of the sensor data prior to the data object being sent to the secure data pool for storage. The method receives a content address-based identifier from the secure data pool after storage therein, and registers the content address-based identifier in a distributed ledger. Multiple data objects from additional sensors and/or additional gateways can be generated and stored in the secure data pool. An application deployment layer may be implemented on the secure data pool and configured to provide at least one application programming interface for a given client application program to access data stored in the secure data pool. Access to the data stored in the secure data pool may enable simulated access.

In additional embodiments, the method generates provenance for the data object and stores the provenance in a distributed ledger prior to permitting access to the data object by the one or more clients. The method may also advertise one or more attributes of the data object in a data marketplace, and receive cryptocurrency in exchange for access to the data object.

In illustrative embodiments, the gateway and plurality of sensors are part of an OT environment, while the one or more clients are part of an IT environment. Advantageously, illustrative embodiments provide for secure access to OT data by IT clients thereby overcoming concerns associated with IT/OT convergence.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, information processing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," "information processing system," "data lake," and the like as used herein are intended to be broadly construed so as to encompass, for example, cloud computing or storage systems, as well as other types of systems comprising distributed virtual infrastructure.

For example, some embodiments comprise a cloud infrastructure hosting multiple tenants that share cloud computing resources. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system.

On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds) with a vast array of computing resources attached to or otherwise a part of IT infrastructure. However, a given embodiment may more generally comprise any arrangement of one or more processing devices.

Figure 1:
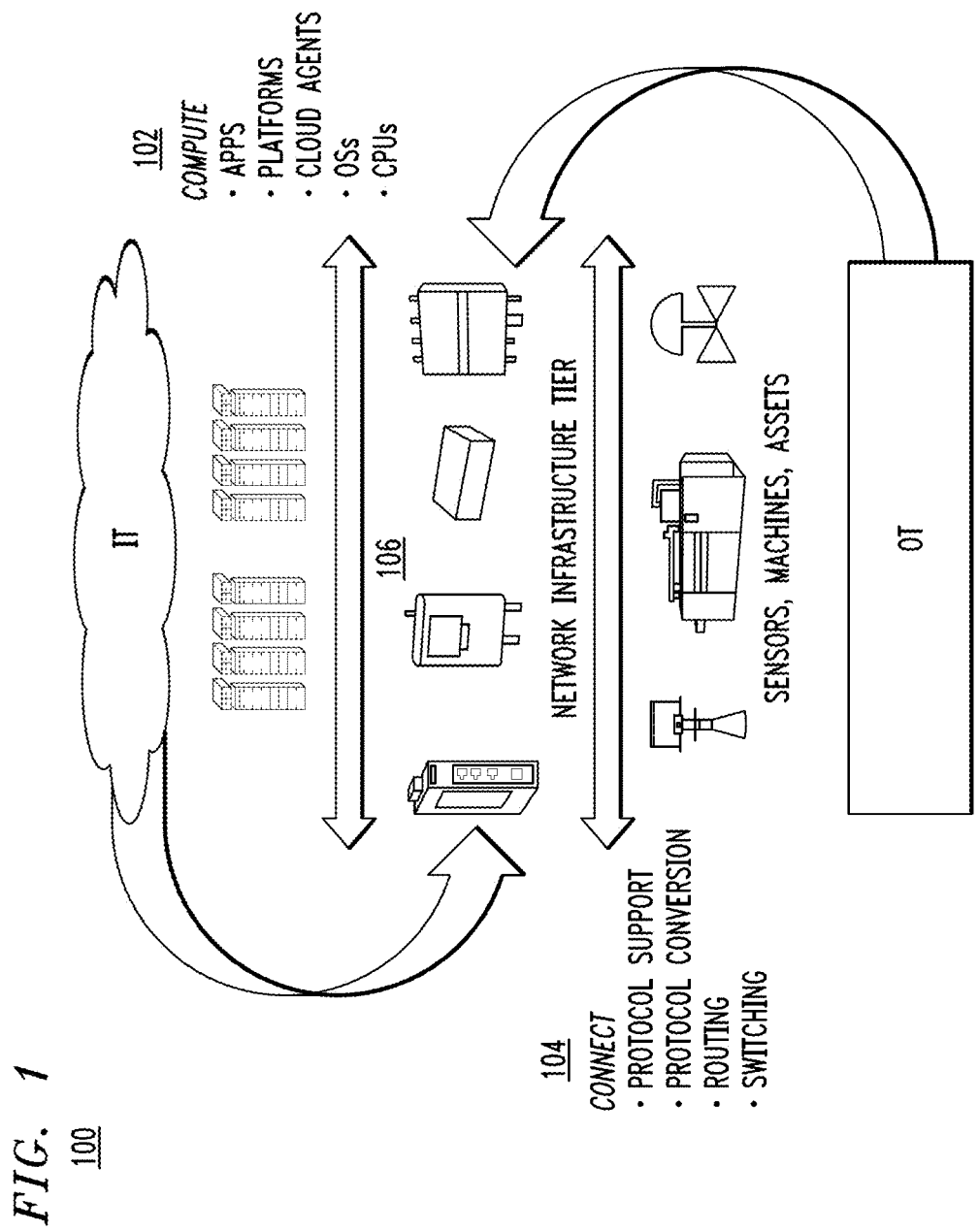
FIG. 1 illustrates an example of convergence of information technology and operational technology from compute and network perspectives.

FIG. 1 highlights an industry focus in a distributed computing environment 100 on the compute 102 and network (connect) 104 aspects of IT/OT convergence. More particularly, FIG. 1 suggests that the introduction of a network infrastructure tier 106 (e.g., gateways that connect into northbound network pipes) can move data back and forth between powerful IT applications and platforms. "Northbound" typically refers to a data direction from OT sensors to IT clients. "Network pipes" typically refers to connectivity mechanisms in a network (e.g., channels, networks, tunnels, routers, switches, clouds, etc.). Furthermore, the term "gateway" is intended to be broadly construed so as to encompass, for example, a computing node that enables data communications between at least two discrete networks. For example, in this case, data collected from sensors is often aggregated on a gateway computing node (gateway) before being forwarded on to analytic engines executed by IT clients.

What is missing from this illustration is an emphasis on the value of data, which for industrial environments, requires an increasing focus on data as a corporate asset. Consider how critical operational data has become:

(i) Enormous costs savings can be driven by treating operational data as an asset. For example, it is realized that within IT service management processes, operational data is critical to ensure that performance and availability Service Levels Agreements (SLAs) are honored, and to drive technology cost reduction through infrastructure optimization.

(ii) The opportunity for a first-ever "data revenue" opportunity based on operational data. For example, in an Internet of Things (IoT) data revenue model, organizations generate revenues by selling packaged data gathered from sensors.

With so much corporate upside (cost reduction, new sources of revenue) to the IT/OT convergence of data sharing and processes, many problems exist in fully leveraging the value of data. One key problem is one of data trust, particularly with regard to the reliability and quality of operational data.

Specifically, the following problems surface when attempting to manage data as an asset in an OT environment.

Lack of a Data Catalog.

When one considers the vast amount of sensor and programmable logic controller (PLC) data being generated, for example, on the floor of a factory, the OT staff currently has no way to organize that data for subsequent inspection, cleaning, protection, etc. This is a fundamental issue for OT data owners, i.e., they do not trust IT to handle data that they first do not understand themselves.

Distributed (e.g., Multi-Site).

The ability to create a data catalog for OT data is further exacerbated by the geographic distribution of corporate sensor and (PLC) environments. Consider the example of the same factory generating data at 20 different locations throughout the country (or the world). There currently is no globally scalable OT-repository for classifying and managing all that data.

Inability to Run Analytics Against OT Data.

Given the lack of a data catalog for OT environments, OT staff are generally unable to create scalable analytic applications to perform their own data analytic tasks on their own data. For example, not only do OT programmers not know how to write cloud-native applications, they also do not have a scalable storage infrastructure onto which they can run these cloud-native applications. This prevents OT teams from being able to leverage artificial intelligence in their business.

Inability to Simulate (Dry-Run) IT Access.

An OT department that wishes to provide data access to northbound IT clients cannot perform a dry-run of that plumbing (connectivity) within its own department. Similarly, the first IT access to OT data often occurs directly against production data (as opposed to an offline set of gateways).

Lack of Data Provenance.

Even if OT data owners were able to catalog and understand all of their data assets across multiple facilities, there is a hesitancy to share that data with northbound applications (e.g., IT systems) because they would lack visibility into who is asking for the data and how they are using it.

Figure 2:
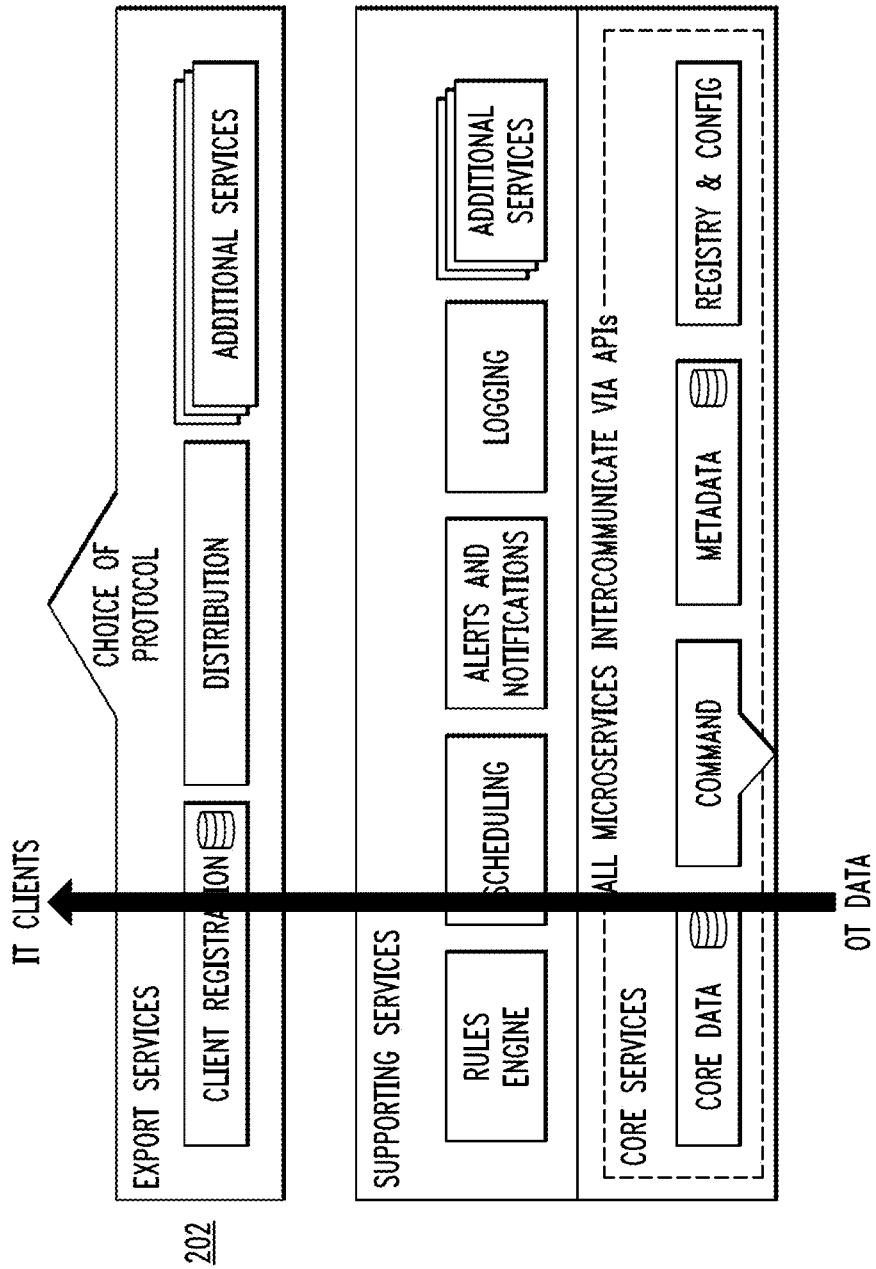
FIG. 2 illustrates a framework that exports operational technology data to information technology clients via an export microservice.

Most gateway systems, for example, allow a northbound application to tap into the flow of sensor data. FIG. 2 highlights a gateway framework 200 that sends data out through an export services microservice 202. However, there is currently no immutable, auditable method for determining who uploaded that data, and when. Note that FIG. 2 depicts a portion of EdgeX Foundry™ (The Linux Foundation®) software which provides an open source microservices framework (i.e., core services, supporting services, and export services) that allows a connection and execution environment for edge devices, e.g., sensors and/or actuators operatively coupled to a gateway.

Trusted Levels to Support Actuator Commands.

A lack of visibility into data's northbound provenance (who is using it and why) also leads to a lack of trust to turn on actuator support for northbound data consumers. If an OT data owner could track the provenance and usage of data to higher-level IT teams, the trust developed over time could serve as a basis for opening up additional privileges. There is currently no programmatic way for an OT data owner to measure that level of trust.

Illustrative embodiments overcome the above and other drawbacks associated with IT/OT convergence. It is to be appreciated that while embodiments are not limited to any particular gateway software framework, one or more illustrative embodiments leverage the ability of EdgeX Foundry™ to be built and run with entire layers and/or services removed from its runtime. This allows an OT team to install gateways that are incapable of being queried from higher-level IT processes.

OT data owners can instead deploy gateway software with a new microservice that stores data "sideways" (or east-west) to a secure data pool. In one or more illustrative embodiments, this new microservice uses data ownership "keys" and blockchain-based data registration techniques to permanently tie generated OT data to the department that is responsible for OT data stewardship. Furthermore, in one or more illustrative embodiments, OT data is stored in a highly-scalable object store that works in tandem with blockchain registration.

Figure 3:
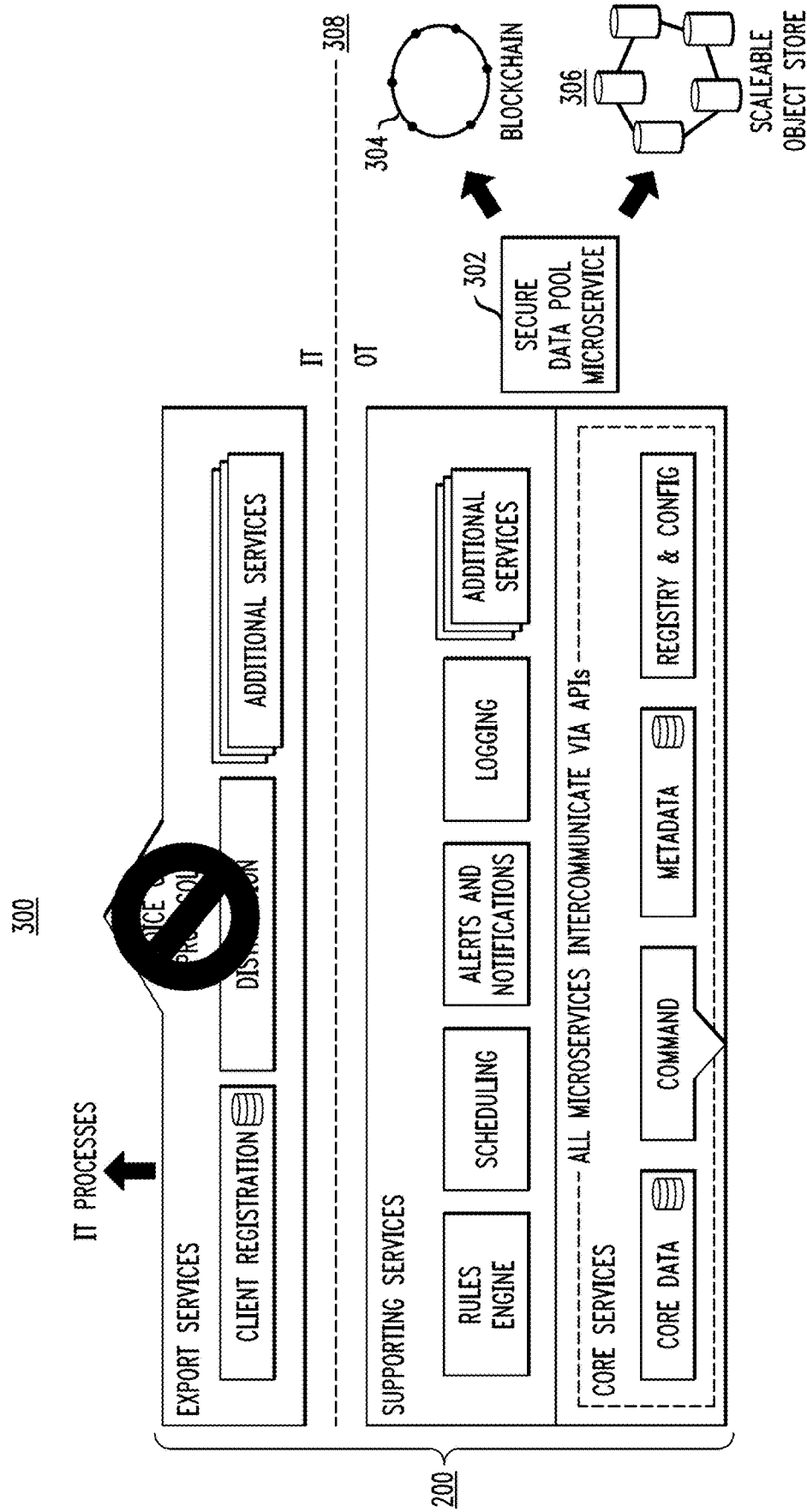
FIG. 3 illustrates a framework that manages operational technology data for secure access by information technology clients via a secure data pool microservice according to one or more illustrative embodiments.

A high-level overview of the solution (with a disabled export services layer) is depicted in FIG. 3. More particularly, framework 300 depicts the framework 200 in FIG. 2 with the following important modifications. First, the export services microservice (202 in FIG. 2) is removed. A secure data pool microservice 302 is operatively integrated into framework 300. Secure data pool microservice 302 is coupled to blockchain 304 and a scalable object store 306, as will be further explained below. The dashed line 308 (separating the IT environment from the OT environment) highlights the flexibility that OT data owners have in creating a secure, scalable industrial data pool that has the following advantages.

The blockchain technology may be any variety of distributed ledger. In the case of a "bitcoin" type implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety. However, distributed ledgers such as, but not limited to, R3 Corda, Ethereum, and Hyperledger may be employed in alternative embodiments.

The EdgeX Foundry™ software, as mentioned above, can be built with a minimum number of required microservices. Therefore, a gateway that is running EdgeX Foundry™ software built without export services would have no ability to be queried for sensor data (or instructed to execute actuator commands), thus completely disabling northbound data access. Note that the "export-disabled" version of EdgeX Foundry™ is referred to below as "EdgeX Foundry OT-only." Further, since embodiments are not limited to any particular gateway software framework, the "export-disabled" version of EdgeX Foundry™ may also be more generally referred to as an "OT system."

In accordance with illustrative embodiments, a new microservice is created that is configured to interface with a secure data pool that is fully owned by an OT data steward. In one or more illustrative embodiments, this data pool has enterprise class security that prevents unauthorized access, provides encryption support, enables immutability (e.g., using content-addressable techniques), and can securely scale and transfer content to other object stores that are part of the same pool. Such a secure data pool can be implemented in a variety of ways. In illustrative embodiments, the secure data pool is implemented as: (i) Dell EMC Elastic cloud storage (ECS); an Inter Planetary File System (IPFS) which is an open-source, content-addressable system that has torrent-like features (but lacks the enterprise hardening of ECS); or a combination thereof. The IPFS system is further described in J. Benet, "IPFS—Content Addressed, Versioned, P2P File System," 2014, the disclosure of which is incorporated by reference herein in its entirety.

Figure 4:
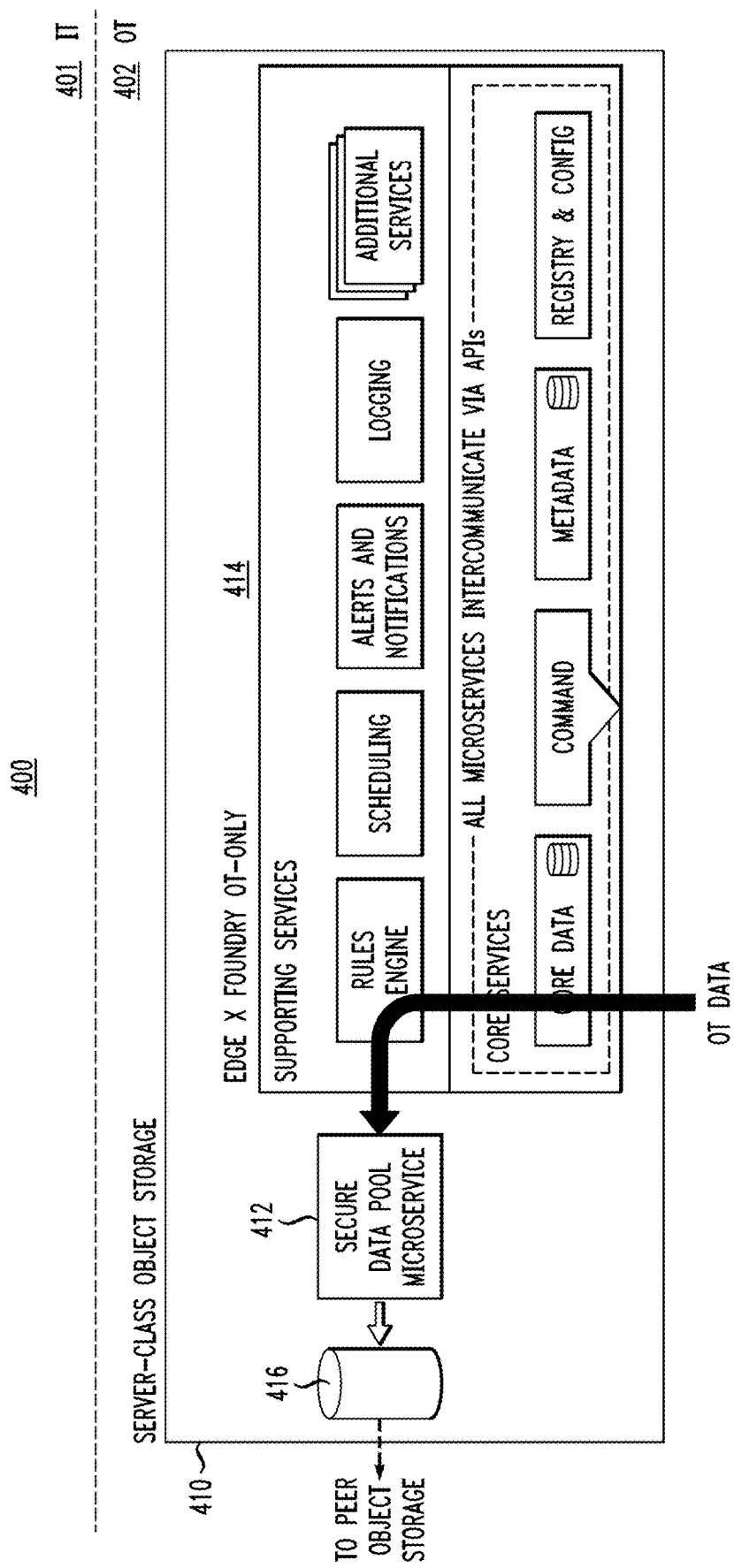
FIG. 4 illustrates a framework that manages operational technology data for secure access by information technology clients via a secure data pool microservice coupled to an object storage system according to an illustrative embodiment.
Figure 5:
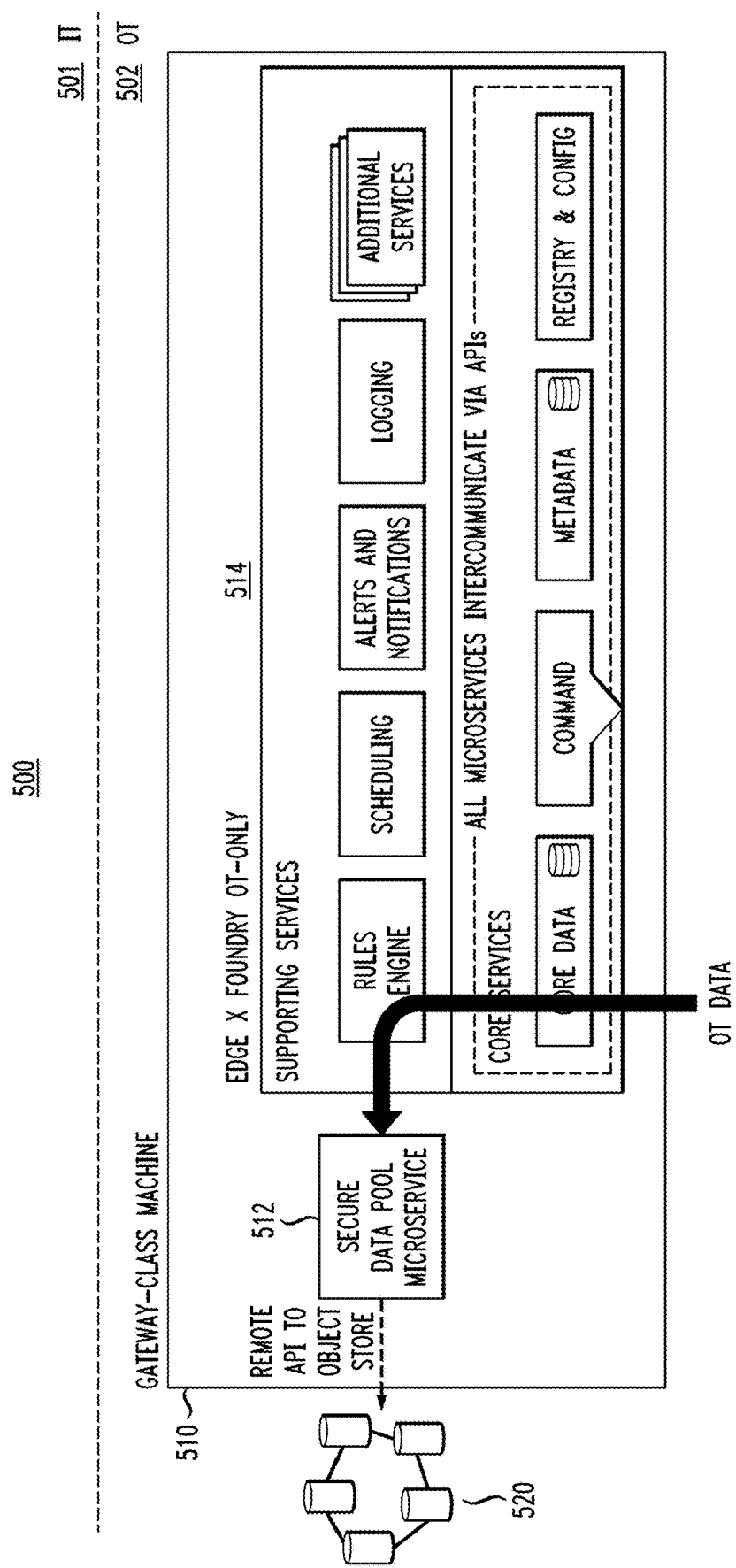
FIG. 5 illustrates a framework that manages operational technology data for secure access by information technology clients via a secure data pool microservice coupled to a distributed ledger system according to an illustrative embodiment.

According to illustrative embodiments, access to the secure data pool occurs in one of two ways:

(i) EdgeX Foundry OT-only has enough compute and store capabilities to function as an object store node (FIG. 4); and (ii) EdgeX Foundry OT-only uses a secure application programming interface (API) to store data to a remote object store (FIG. 5).

Note that while an object store is described as an illustrative approach to store OT data, other approaches may be used, such as massively scalable databases or file systems (e.g., IPFS can also be accessed as a distributed file store on top of an object store).

As shown in system environment 400 in FIG. 4, where a dashed line functionally distinguishes an IT environment 401 from an OT environment 402, a server-class object storage system 410 comprises a secure data pool microservice (SDPM) 412 which receives operational technology (OT) data (e.g., sensor data) from EdgeX Foundry OT-only framework 414. SDPM 412 stores the received OT data on an object store node 416 resident on the server-class object storage system 410.

As shown in system environment 500 in FIG. 5, where a dashed line functionally distinguishes an IT environment 501 from an OT environment 502, a gateway-class machine 510 comprises a secure data pool microservice (SDPM) 512 which receives OT data (e.g., sensor data) from EdgeX Foundry OT-only framework 514. SDPM 512 uses an API to store the received OT data on a scalable object store system 520 remote from the gateway-class machine 510.

The SDPM, as it receives data from OT environments, is configured to organize the OT data in any number of ways. This enables the data to provide the most value for a corporation (e.g., consumed by specific applications, searched more easily, readied for monetization, etc.). It also enables the SDPM to minimize the amount of secure data pool storage used. The SDPM attached metadata to incoming OT data and, in some embodiments, is configured to group sensor readings in any number of ways, including but not limited to:

(i) Every "Nth" reading from a particular sensor (e.g., every 100 readings from a specific thermostat are grouped and stored by the SDPM);

(ii) All readings from one sensor over a given time frame (e.g., every hour, or 4 times per day); and (iii) All readings from all sensors connected to a given gateway, either by count or by time period.

Figure 6:
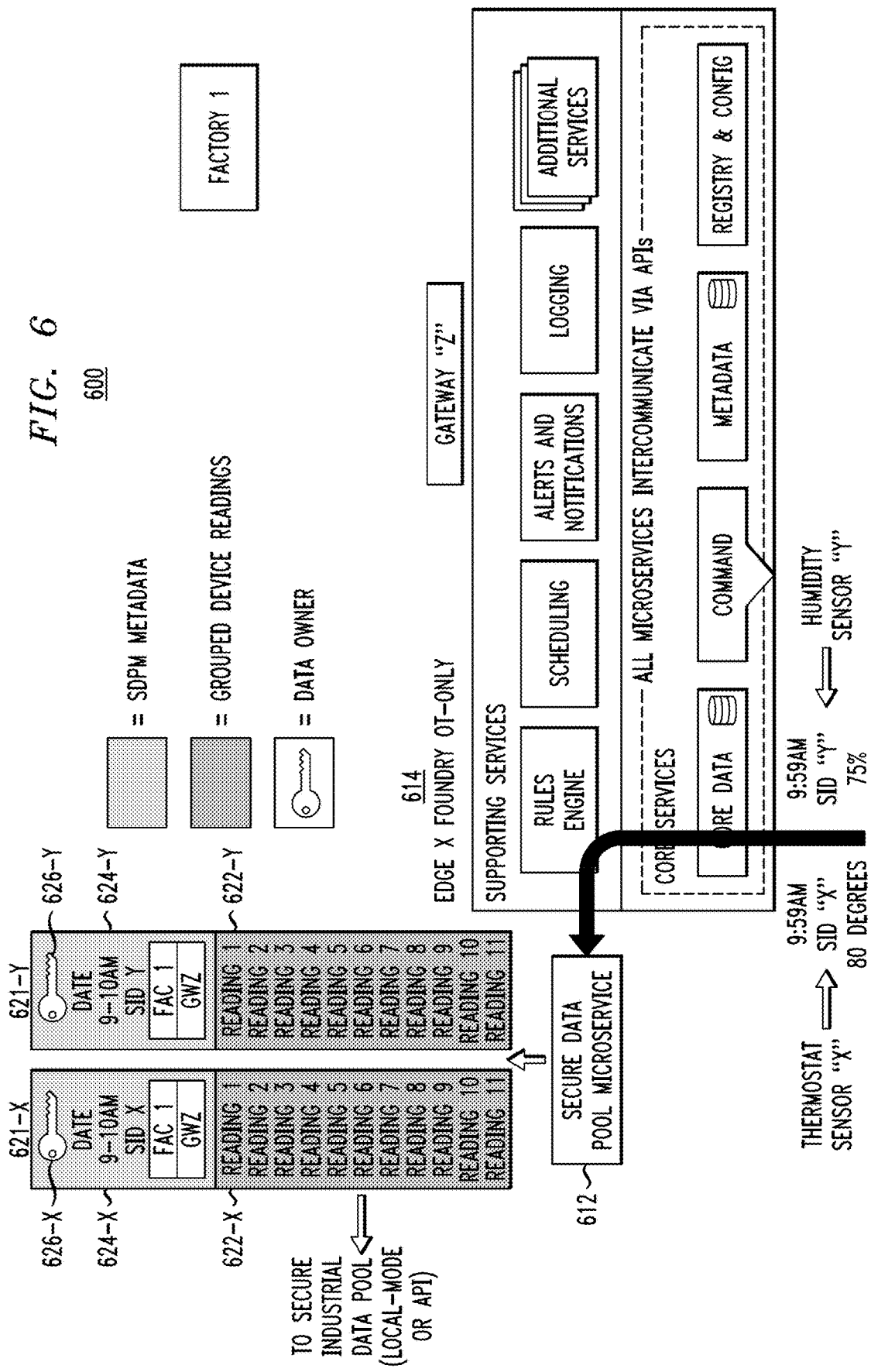
FIG. 6 illustrates data grouping for storage in a secure data pool according to an illustrative embodiment.

FIG. 6 illustrates an embodiment 600 wherein an SDPM 612 creates metadata and stores thermostat and humidity readings (received from an EdgeX Foundry OT-only framework 614) separately to an object store (locally as in FIG. 4, remotely as in FIG. 5, or some combination thereof). It is assumed that thermostat readings are from a thermostat sensor X, and the humidity readings are from a humidity sensor Y, both reporting their sensor data to gateway Z (EdgeX Foundry OT-only framework 614) associated with an industrial setting identified as Factory 1.

The example in FIG. 6 illustrates a grouping where SDPM 612 is configured to collect readings on an hourly basis (e.g., 9-10 AM) and then append those readings (referenced as 622-X for thermostat sensor X and 622-Y for humidity sensor Y) with additional SDPM metadata such as date, sensor ID (SID X and SID Y), gateway ID (GWZ), factory ID (FAC 1), etc. (referenced as 624-X for thermostat sensor X and 624-Y for humidity sensor Y). SDPM 612 then packages the metadata and readings together as one file or object (referenced as 621-X for thermostat sensor X and 621-Y for humidity sensor Y) for storage in the secure data pool. As mentioned, the storage occurs locally (FIG. 4) or via calling an API to store the object (or file) off-box (FIG. 5).

Note that SDPM metadata 624-X and 624-Y can also describe the nature of the sensor data that is being stored (e.g., fields are described, or a sentence describing the sensor is recorded, or both). Further, SDPM metadata can include information about the "owner" of the data as symbolized by a key in FIG. 6 (e.g., referenced as 626-X for thermostat sensor X and 626-Y for humidity sensor Y). Note that the same owner can be specified in both objects (e.g., 626-X is equal/identical to 626-Y).

The establishment of data ownership can be accomplished in any number of ways. In one embodiment, the corporate identity of an individual or of a department is used as the identifier. In another embodiment, a decentralized ID is used. Decentralized IDs are often stored on public ledgers (e.g., the Bitcoin ledger) and are registered and accessed by technologies such as Blockstack. Blockstack is described in detail, for example, in M. Ali et al., "Blockstack: A Global Naming and Storage System Secured by Blockchains," Proceedings of the 2016 USENIX Annual Technical Conference, p. 181-194, June 2016, the disclosure of which is incorporated by reference herein in its entirety.

The owner represented by 626-X or 626-Y can be, for example:

(i) The sensor that generated the data (object 621-X is owned by thermostat sensor X or object 621-Y is owned by humidity sensor Y);

(ii) The gateway that generated the data (Gateway Z);

(iii) The factory that generated the data (Factory 1);

(iv) A corporate individual, department, or legal entity that has created and registered a decentralized ID for themselves; or (v) Any registered identity.

In one or more illustrative embodiments, each of the owners listed above has a private cryptographic key, and uses the key to digitally sign the object (621-X or 621-Y). The resulting signature proves that only the entity with the private key could have generated the signature.

Once ownership attributes have been embedded into the object (e.g., the owner's decentralized identity), and the object signed via that identity, a set of advantageous features can then be enabled (e.g., provenance, monetization, etc.). These features will now be described below.

Once the object has been fully formed by SDPM 612, it is committed to a secure industrial data pool storage layer. FIG. 6 depicts an example where object 621-X (the readings for thermostat sensor X) is placed into an object store and a content address is generated.

Figure 7:
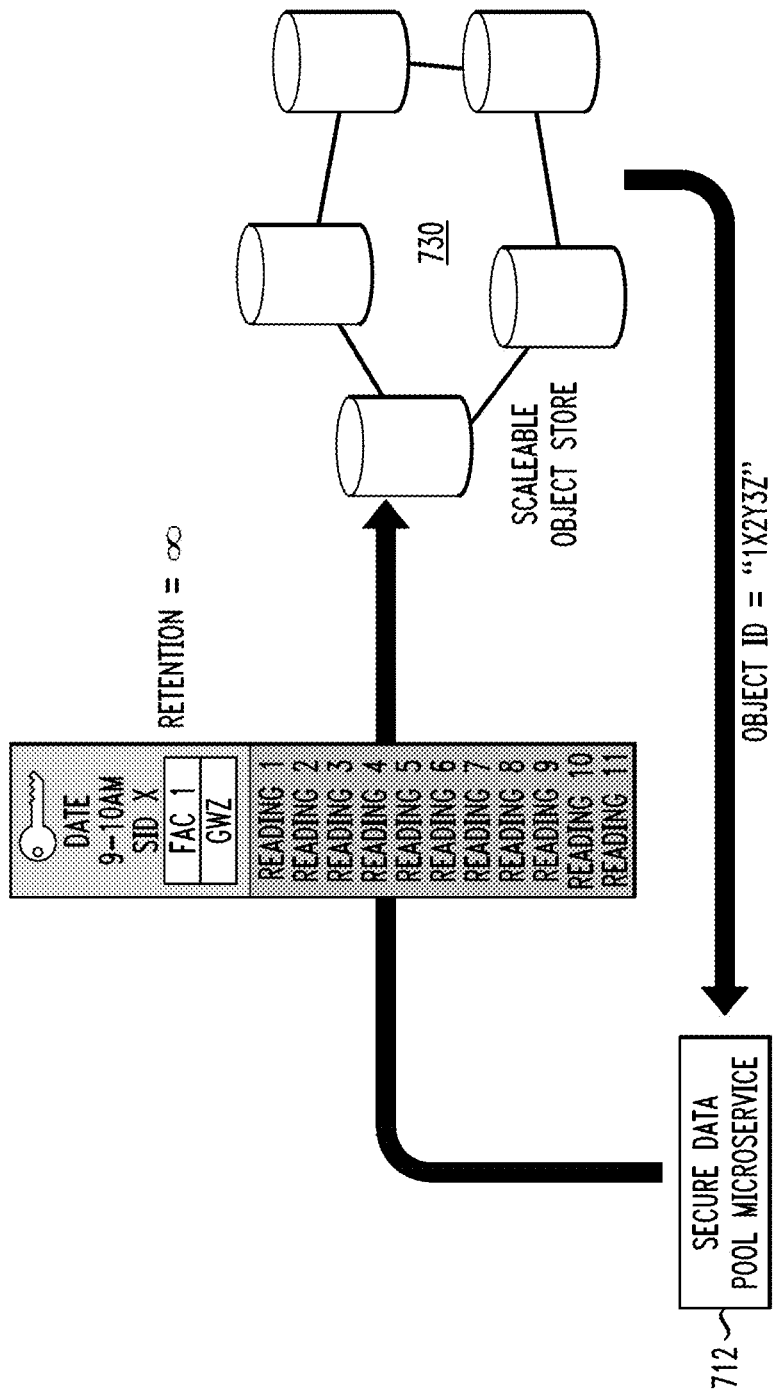
FIG. 7 illustrates a secure data pool microservice committing an object to a secure data pool according to an illustrative embodiment.

In one or more illustrative embodiments, the process of committing the object also involves the specification of a retention period. FIG. 7 depicts embodiment 700 wherein SDPM 712 writes an object 722 to a scalable object store 730 with an infinite retention period (which means the object can never be deleted). Upon successful storage of the object, a unique "content address" or "object ID" is returned to SDPM 712.

Figure 8:
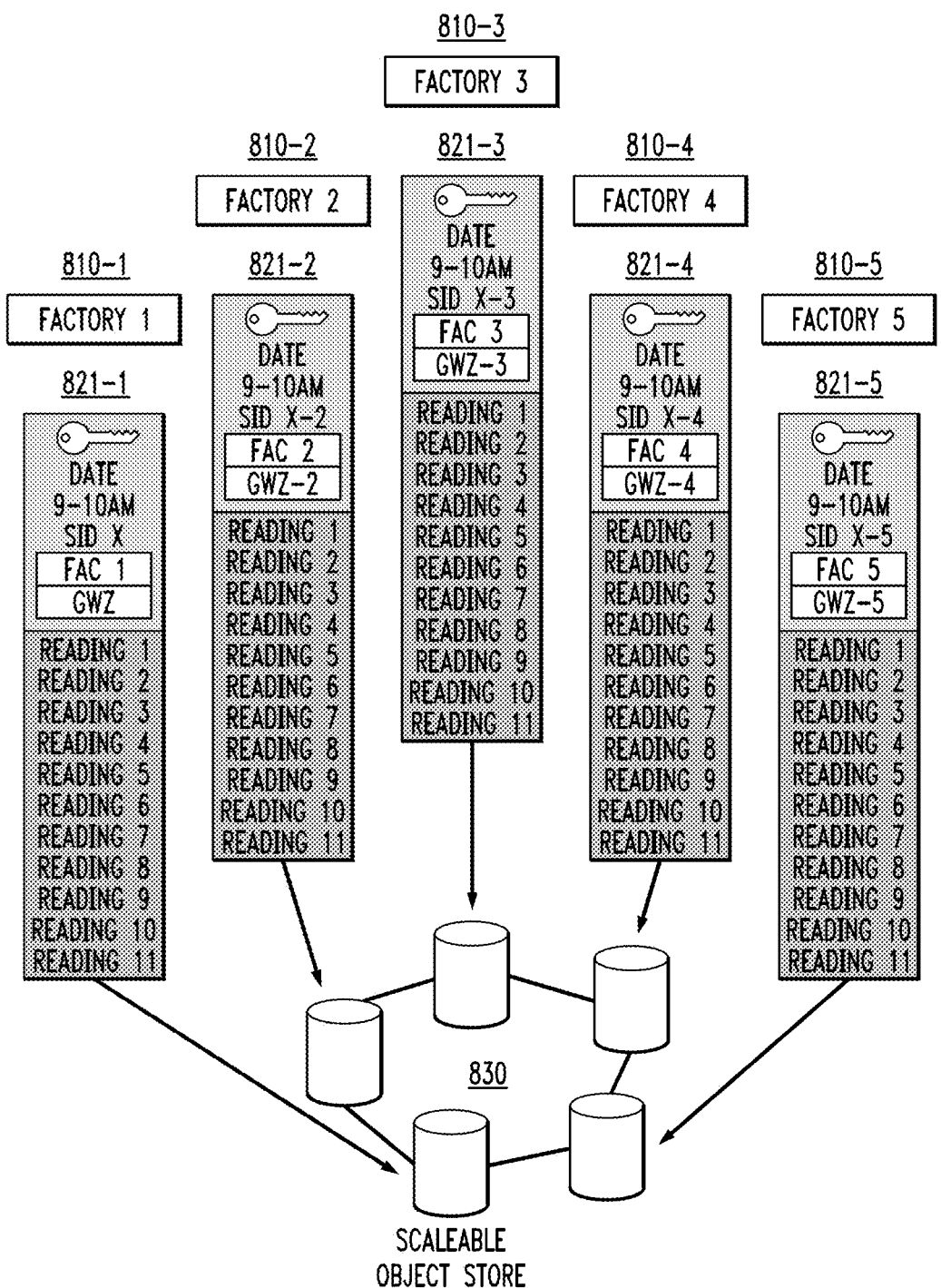
FIG. 8 illustrates multi-factory insertion of data into a secure data pool according to an illustrative embodiment.

The fact that the object store 730 is "scalable" means that the object, for example, might appear in the address space of other national (or global) factories that are part of the same company. FIG. 8 depicts embodiment 800 wherein five different factories 810-1 through 810-5 are using different gateways to monitor temperature. As each factory uses the SDPM microservice (not expressly shown in FIG. 8) to generate sensor data objects (821-1 through 821-5, each including readings and metadata as explained above), a scalable object store 830 is configured to store and allow analytic access (via IT clients) to all sensor data from any given factory.

As the SDPM microservice creates and inserts content into a secure data pool (i.e., scalable object store 830), in one or more illustrative embodiments, SDPM is configured to perform additional functions:

(i) Transform the data into a variety of different formats. For example, there may be a time-series database application that is used heavily by the company and, in such an embodiment, the SDPM creates an object in that format if desired.

(ii) The SDPM encrypts the sensor data so that the data cannot be accessed without a private key.

(iii) The SDPM specifies data protection policies that mirror a certain number of copies across the object store (e.g., 830).

(iv) The SDPM integrates, augments, or enriches the data with other sources that are available. In one embodiment, Dell Boomi technology is used for this purpose.

Now that a scalable data layer has been created in an OT environment, it is possible for application developers to begin writing scalable applications by inserting a Platform-as-a-Service (PaaS) layer on top of the object store. The PaaS layer of course can be deployed across factories, and the PaaS deployment can of course run completely within an OT environment or extend up into an IT environment as depicted in FIG. 9.

Figure 9:
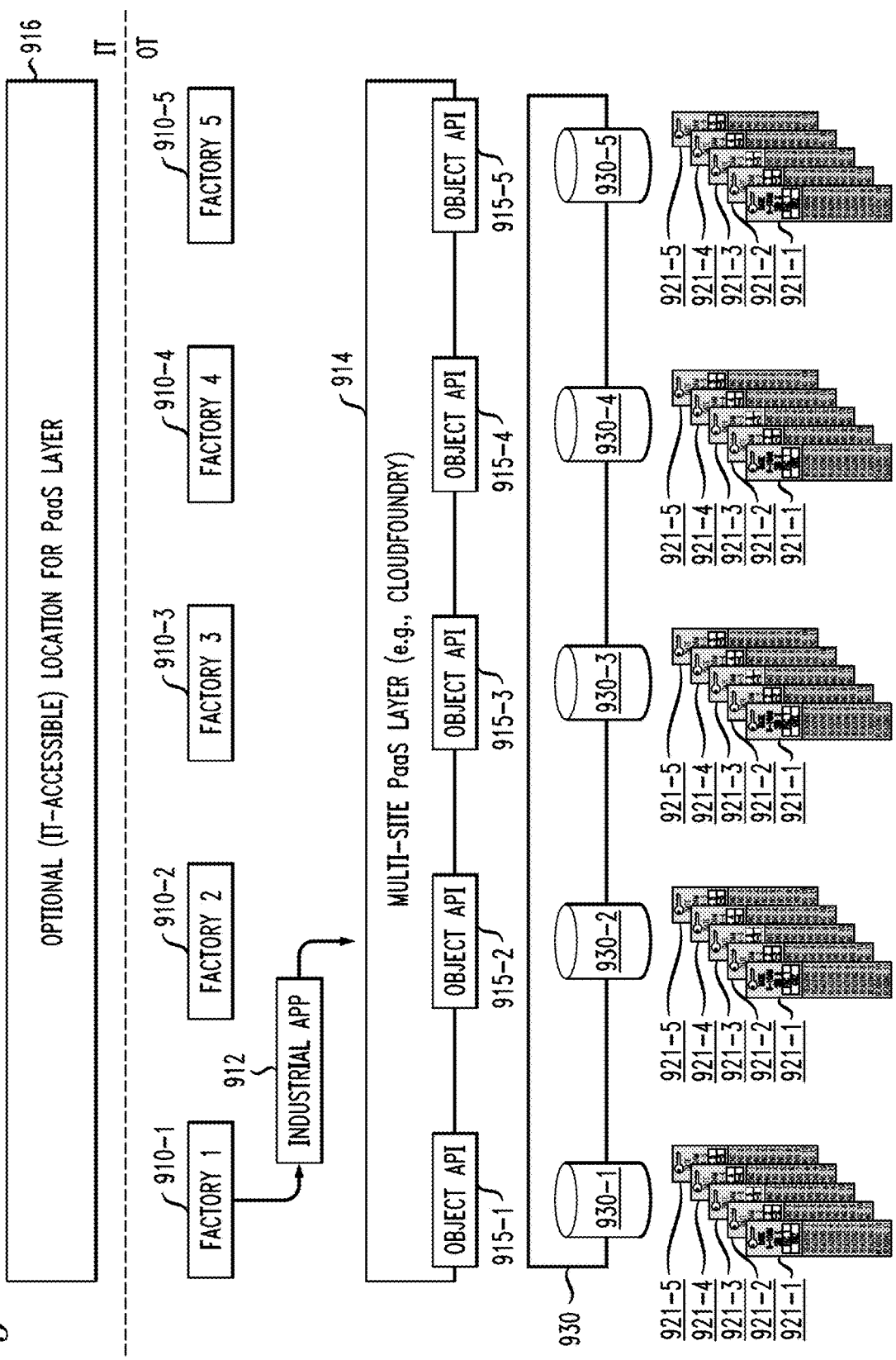
FIG. 9 illustrates a platform-as-a-service layer for industrial application access to a secure data pool according to an illustrative embodiment.

More particularly, FIG. 9 depicts embodiment 900 wherein an application developer has written and is deploying a new industrial application 912 in a given factory, i.e., Factory 1 (910-1) in a plurality of factories 910-1 through 910-5. The application 912 uses an object API (915-1) from a plurality of object APIs 915-1 through 915-5 associated with multi-site PaaS layer 914 to access previously captured gateway data that now exists within a secure industrial data pool 930. Note that it is assumed that each of the object storage devices (930-1 through 930-5) of the secure industrial data pool 930 have stored thereon objects (921-1 through 921-5) generated for each factory (910-1 through 910-5). However, in alternative embodiments, the same objects do not have to be stored on each object storage device. Further, note that the PaaS layer 914 deployed in the OT environment can additionally or alternatively be deployed in the IT environment as PaaS layer 916. One nonlimiting example of PaaS tool that is used to provide the PaaS layer 914 (and/or 916) is the CloudFoundry® product available from the Cloud Foundry Foundation, which provides application developers with the functionality of a versatile PaaS application deployment layer. Once the application 912 is deployed to the PaaS layer 914, implementations such as CloudFoundry® are able to elastically scale the application 912 so that it can fully access any object stored in the secure data pool 930.

As mentioned above, the PaaS layer can run in an OT context (as 914), or if desired the PaaS layer can be made accessible to the IT organization (as 916) for similar types of data access without allowing an IT organization to directly access gateway devices.

If an OT organization has a long-term goal of allowing IT (or OT) applications to directly access sensor data via a gateway, illustrative embodiments provide a mechanism for simulating this type of access in advance of communication with live gateway devices.

Figure 10:
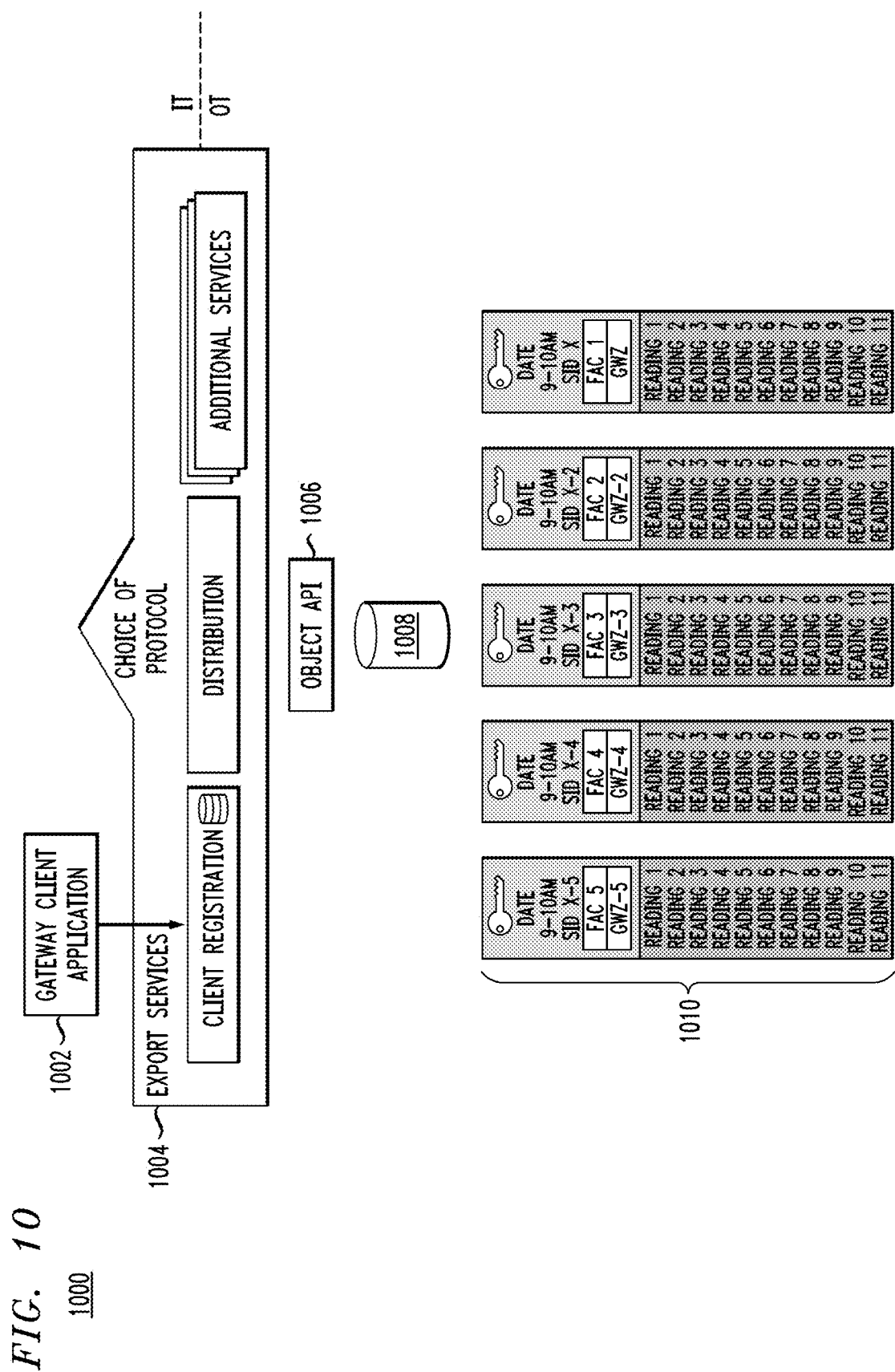
FIG. 10 illustrates a framework that exports operational technology data to information technology clients from a secure data pool according to an illustrative embodiment.

Gateway software can be modified to use a secure industrial data pool, according to illustrative embodiments, as a source of sensor data. FIG. 10 depicts embodiment 1000 to implement this functionality.

As mentioned previously, EdgeX Foundry™ can be built using a subset of available EdgeX Foundry™ microservices. In the example shown in FIG. 10, assume the northbound services are available for normal export service capabilities for gateway clients, but the southbound functionality has been modified to point at a secure data pool. More particularly, as shown, gateway client application 1002 utilizes export services microservice 1004 (part of EdgeX Foundry™) to access sensor data. However, rather than accessing the sensor data directly from the sensors in the OT environment, in illustrative embodiments, the EdgeX Foundry™ framework is adapted to obtain the requested data via an object API 1006 from part of a secure data pool 1008, which stores sensor data objects 1010 (which includes one or all of the sensor data requested by application 1002).

The EdgeX Foundry™ software has visibility to the outputs of many different sensor devices and gateways across multiple factories, and can choose to simulate some subset or all of this data. This allows a gateway client, whether it be running in an IT or an OT context, to test out its application functionality against what appears to be a live gateway. There is no risk in this environment of a gateway client attempting to control an actuator. The gateway client application, 1002 in this example, can be fully tested and qualified in such an environment before installing it in a production context. Multiple gateway clients can be simulated against multiple EdgeX Foundry™ simulators as well.

Further, the EdgeX Foundry™ simulator can choose the pace at which it emits sensor readings. It can churn through them as quickly as possible, or it can distribute them over time using the same historical frequency at which they had previously arrived.

And finally, in one or more illustrative embodiments, the export services layer (1004 in FIG. 10) is configured to support time-based queries and/or configured to return data as from past time periods (going back days, months, or years).

Furthermore, the use of a content-addressable object store or file system, in accordance with one or more illustrative embodiments, has multiple benefits. One benefit is that when the SDPM microservice initially captures data and stores it to an object store, a content address is returned. Recall that in FIG. 7, described above, an example content address ("1X2Y3Z") was returned from the object store 730 to the SDPM 712. The content address is used as a "claim check" to retrieve the content, but also as a cryptographic hash that is used to verify that the object has not been modified since its initial capture.

Figure 11:
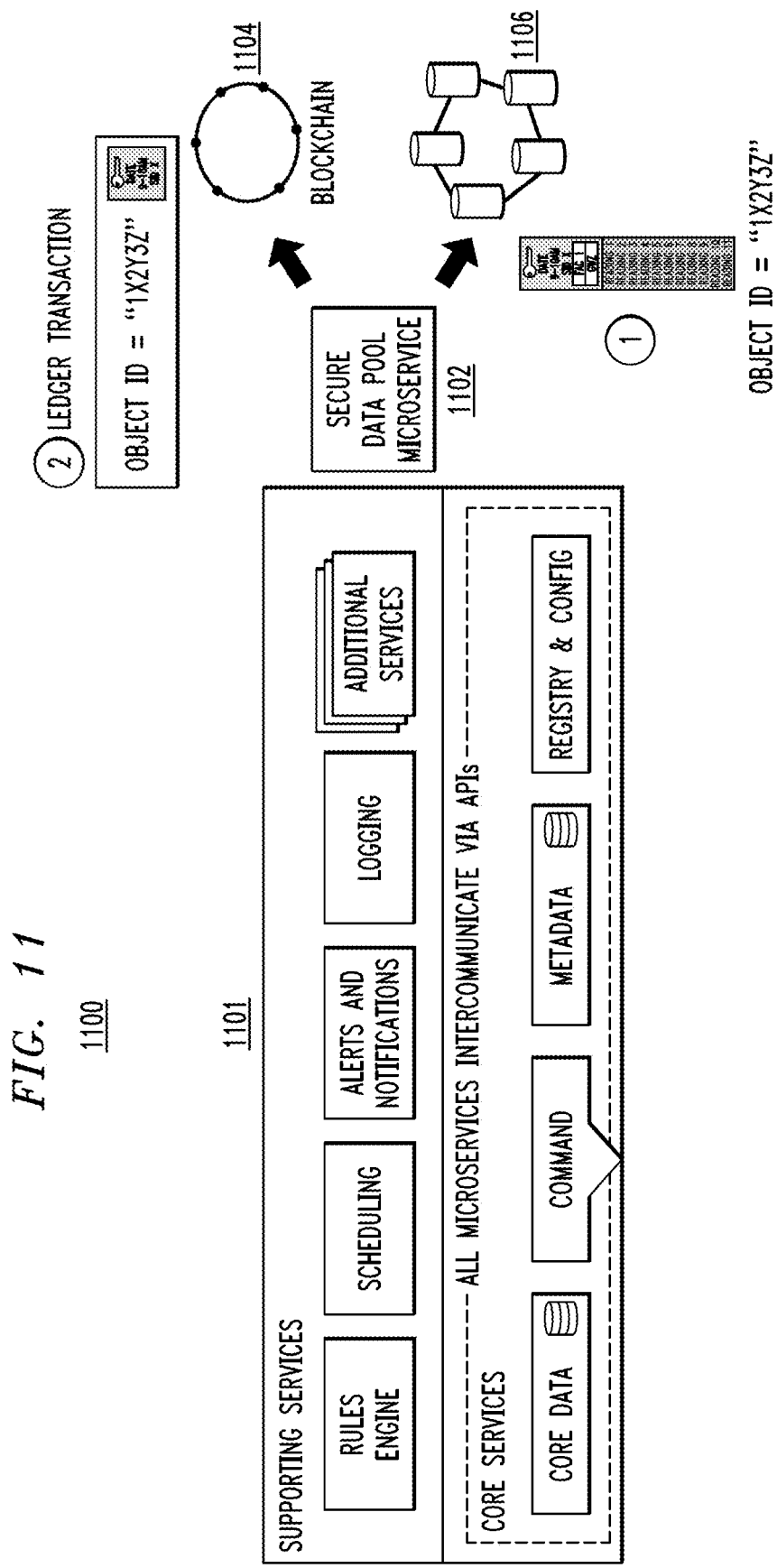
FIG. 11 illustrates data registration of operational technology data via a distributed ledger according to an illustrative embodiment.

A content address serves another purpose. It allows the SDPM microservice to register the content within a distributed ledger, e.g., a blockchain system. FIG. 11 depicts this approach.

As shown in embodiment 1100 in FIG. 11, EdgeX Foundry OT-only framework 1101 is operatively coupled to SPDM 1102, which is operatively coupled to blockchain system 1104 and scalable object store 1106. Scalable object store 1106 serves as a secure industrial data pool.

In phase 1 of embodiment 1100, SDPM 1102 stores a sensor data object to object store 1106 and receives the object ID (content address "1X2Y3Z") in return (as described above in the context of FIG. 7).

In phase 2 of embodiment 1100, SDPM 1102 creates a ledger transaction that registers the object ID "1X2Y3Z", in blockchain system 1104, along with at least a portion of the metadata found within the original object (e.g., see 624-X in FIG. 6). Note that the portion of the metadata stored in blockchain system 1104 is not necessarily the same metadata stored within the object store 1106, although it can be.

The use of data registration using distributed ledger technology has a number of advantages, by way of example:

(i) The distributed ledger (blockchain) can be queried to determine what content is available within the secure industrial data pool, when it was created, who created it, and/or who owns it. This is especially useful when an OT administrator does not wish to make the entire object store available outside of an OT environment.

(ii) The distributed ledger (blockchain) can also be used as an alternative "proof of ownership". The data referred to as "1X2Y3Z" is uniquely associated with an owner possessing a private key. This ownership enables other benefits, by way of example:
  a) Provenance (the original owner of the data can be traced);
  b) Data marketplace (the original owner can market the data within and/or outside the company); and
  c) Monetization (the original owner can receive cryptocurrency after advertising data).

In one or more illustrative embodiments, the registration of data ownership for industrial data on a blockchain serves as the basis for tracking the lineage of data as it is given to other data consumers. These data consumers can be part of the same company (e.g., the IT department, or some other department such as marketing or sales). Current approaches do not allow for permanently tracking the flow of data as it moves to new consumers. This data flow is permanently recorded on a blockchain (e.g., 1104).

A first method of using a blockchain to record provenance is in the use case where a client is directly accessing a secure industrial data pool (as opposed to retrieving data through a gateway). In this case, the data stored in a secure industrial data pool has (preferably) been tagged with a registered decentralized ID that identifies the owner. The owner has a private key that can be used to generate 'certificates" that grant read permissions to clients that wish to access the data.

This technique is further described in U.S. Ser. No. 15/660, 385, filed on Jul. 26, 2017 and entitled "Decentralized Identities for Access to Multiple Computing Resource Systems," the disclosure of which is incorporated by reference herein in its entirety. In accordance with one or more illustrative embodiments, the SDPM is configured to audit all requests for content and keep track of who receives which content.

Figure 12:
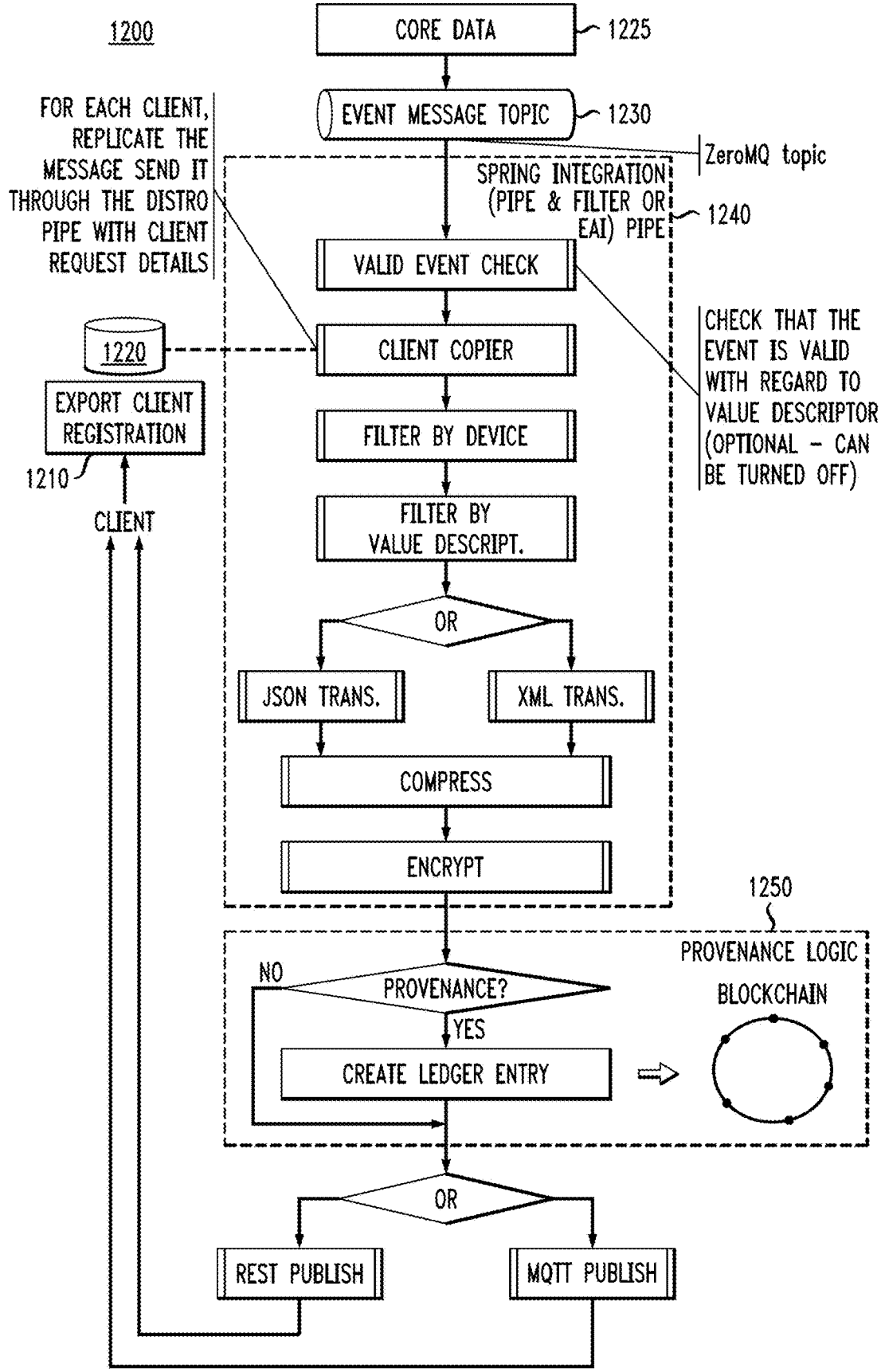
FIG. 12 illustrates provenance logic for use during export of operational technology data according to an illustrative embodiment.

Another use case for provenance is when accessing sensor data via a gateway device. FIG. 12 illustrates embodiment 1200 wherein data flows through a pipeline (e.g., the pipeline executed as part of EdgeX Foundry's export services execution) it can regularly (e.g., every hour, or every "N" entries) record (in a blockchain) that certain data assets are being exported to a particular client.

More particularly, FIG. 12 shows process 1200 performed in a gateway (e.g., as part of gateway software) with respect to clients who are registered through export client registration process 1210 and database 1220. Process 1200 shows sensor data ("core data") 1225 passing through an event message topic module 1230 and entering a pipeline 1240 of the gateway. An event message topic is assigned by module 1230 to the sensor data 1225. In this example, the pipeline 1240 includes an EdgeX Foundry™ framework (left hand side of pipeline 1240) and a transformation framework (right hand side of pipeline 1240). The EdgeX Foundry™ framework performs a valid event check, copies the sensor data 1225 for each registered client, and filters the sensor data. As shown, the data is filtered by sensor (device) and value descriptor.

As data flows through the pipeline 1240 (e.g., filtering, encrypting, etc.) in the EdgeX Foundry™ framework, a call to a distributed ledger (blockchain) is considered by provenance logic 1250 just before the data is published externally. Thus, provenance logic 1250 determines whether or not this particular data set is being traced for provenance, and if so, the logic 1250 determines whether or not a new ledger transaction is generated. If provenance is being traced, then a ledger entry in a blockchain system is created before the data is published. If provenance is not being traced, then the data is published as normal.

These ledger transactions establish the exchange of data from a data owner to a data consumer, and the amount of data tracked in the ledger can vary. The data can, for example, represent groups of sensor readings or readings from a period of time, that were sent to a given client.

Once a secure data pool, as described above, has been established, the OT/IT environment is now in a much better position to capitalize on monetization of data. A secure industrial data pool has the following characteristics:

(i) Industrial data has been securely stored and protected;
(ii) Metadata describing the industrial data has been attached;
(iii) Both the data and metadata has been timestamped and are tamper-proof, immutable, and non-delete-able;
(iv) A data steward has established clear ownership of the data in potentially two locations: as part of the metadata; and registered on a blockchain.
(v) The data steward is able to record the provenance/lineage of the industrial data as it is requested by clients; and
(vi) Monetization of the data can occur in a number of ways.

One method is to leverage the ability of the blockchain system to transfer cryptocurrency tokens between parties. The data steward can advertise their personal wallet and mandate (via smart contract protocols, for example) that transfers into that wallet occur before the industrial data is released to a client.

Another method is for the data steward to identify data marketplaces and advertise the availability of industrial data that has accumulated in the secure industrial data pool. For example, in one or more illustrative embodiments, the data steward advertises the following data availability:

(i) TYPE of data, based on the metadata that is stored along with the sensor data in the data pool;
(ii) TIME RANGE of the data, based on the metadata that is stored along with the sensor data; and
(iii) AMOUNT of data, based on how many sensor readings exist within the data pool for that time range.

Figure 13:
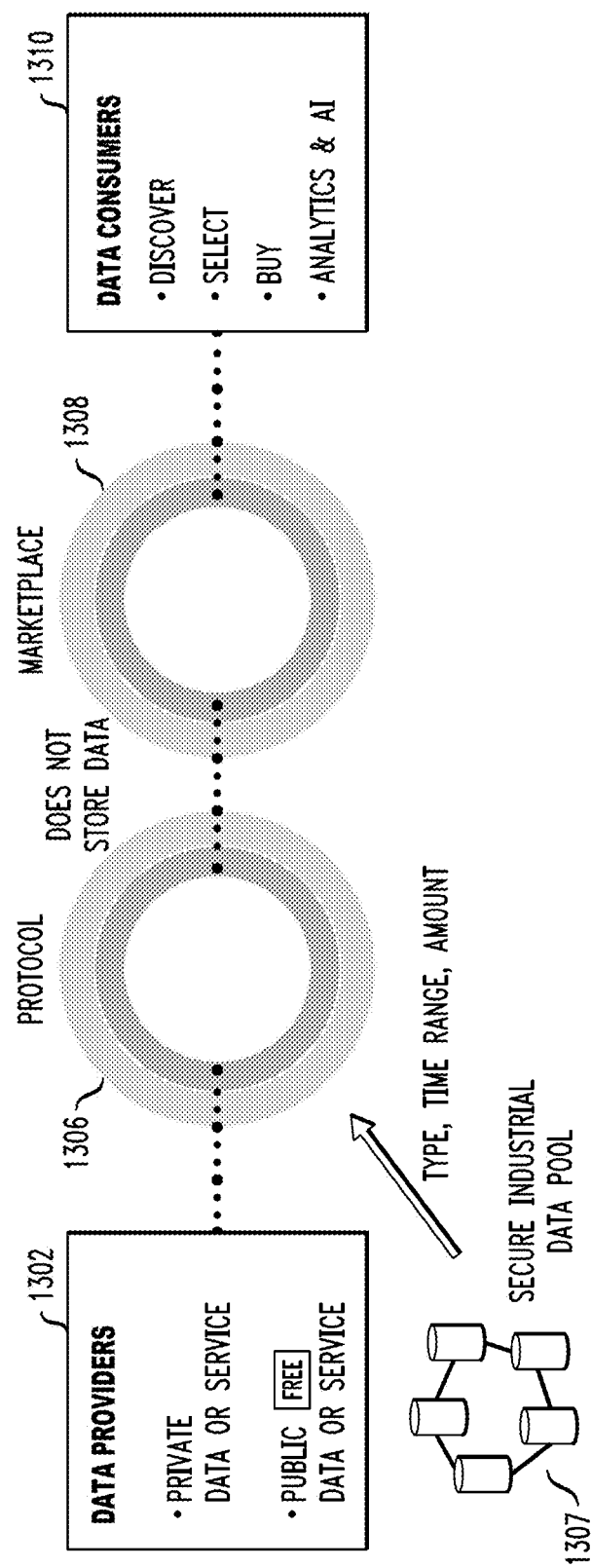
FIG. 13 illustrates a process of advertising operational technology data for monetization in a data marketplace environment according to an illustrative embodiment.

One example of an emerging data marketplace environment in the industry is the Ocean protocol and DEX data marketplace as depicted in FIG. 13.

The Ocean Protocol (available from Ocean Protocol Foundation Ltd., Singapore) is a decentralized data exchange marketplace that can match data producers (e.g., a gateway) to data consumers (e.g., corporate artificial intelligence (AI) algorithms willing to pay for certain types of data).

Once the decision has been made to advertise data to a data marketplace, FIG. 13 illustrates a process 1300 of a gateway, department, or corporation (a data producer or provider 1302) leveraging a data marketplace protocol 1306 (the Ocean Protocol) to advertise data assets stored in a secure industrial data pool 1307, formed in accordance with illustrative embodiments, to a data marketplace 1308 (e.g., DEX marketplace). The data advertisement to the marketplace is accompanied by TYPE, TIME RANGE, and AMOUNT, as described above. Then, the advertised data may be purchased in the data marketplace 1308 by data consumer(s) 1310 whereby the data provider 1302 receives cryptocurrency or some other form of payment from the data consumer 1310 in return for access to the advertised data.

Figure 14:
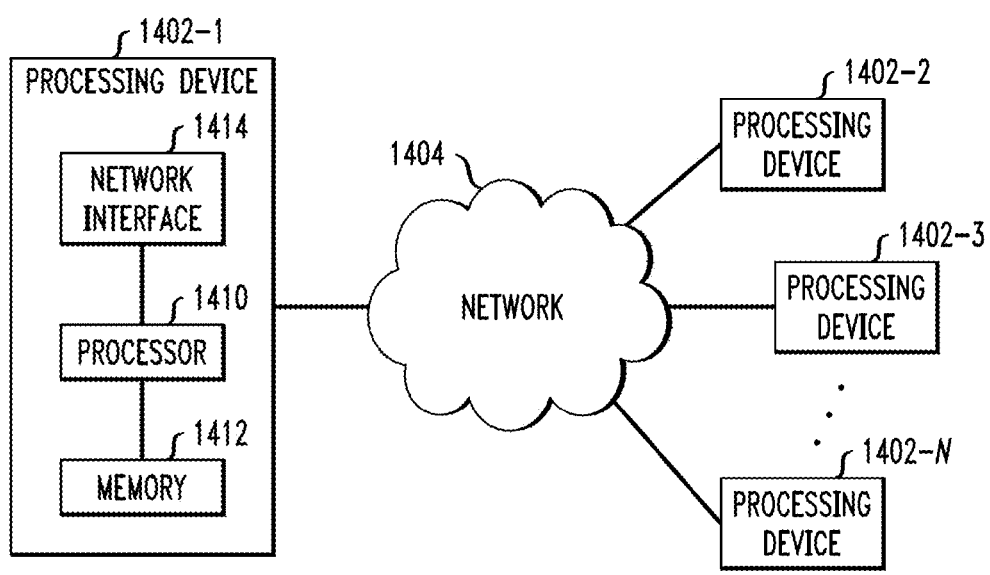
FIG. 14 illustrates a processing platform used to implement a secure data pool system according to an illustrative embodiment of the invention.

As an example of a processing platform on which a secure data pool framework environment (as shown in FIGS. 1-13) according to illustrative embodiments can be implemented is processing platform 1400 shown in FIG. 14. The processing platform 1400 in this embodiment comprises a plurality of processing devices, denoted 1402-1, 1402-2, 1402-3, . . . 1402-N, which communicate with one another over a network 1404. It is to be appreciated that methodologies described herein may be executed in one such processing device 1402, or executed in a distributed manner across two or more such processing devices 1402. Thus, the framework environment may be executed in a distributed manner across two or more such processing devices 1402. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 14, such a device comprises at least one processor and an associated memory, and implements one or more functional modules for instantiating and/or controlling features of systems and methodologies described herein. Multiple elements or modules may be implemented by a single processing device in a given embodiment.

The processing device 1402-1 in the processing platform 1400 comprises a processor 1410 coupled to a memory 1412. The processor 1410 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1410. Memory 1412 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1412 may comprise electronic memory such as random access memory (RAM), read-only memory (ROM) or other types of memory, in any combination. The one or more software programs when executed by a processing device, such as the processing device 1402-1, causes the device to perform functions associated with one or more of the components/steps of system/methodologies in FIGS. 1-13. One skilled in the art would be readily able to implement such software given the teachings provided herein. Other examples of processor-readable storage media embodying embodiments of the invention may include, for example, optical or magnetic disks.

Processing device 1402-1 also includes network interface circuitry 1414, which is used to interface the device with the network 1404 and other system components. Such circuitry may comprise conventional transceivers of a type well known in the art.

The other processing devices 1402 (1402-2, 1402-3, . . . 1402-N) of the processing platform 1400 are assumed to be configured in a manner similar to that shown for processing device 1402-1 in the figure.

The processing platform 1400 shown in FIG. 14 may comprise additional known components such as batch processing systems, parallel processing systems, physical machines, virtual machines, virtual switches, storage volumes, etc. Again, the particular processing platform shown in this figure is presented by way of example only, and the data valuation system and cloud infrastructure described herein may include additional or alternative processing platforms, as well as numerous distinct processing platforms in any combination.

Also, numerous other arrangements of servers, clients, computers, storage devices or other components are possible in processing platform 1400. Such components can communicate with other elements of the processing platform 1400 over any type of network, such as a wide area network (WAN), a local area network (LAN), a satellite network, a telephone or cable network, or various portions or combinations of these and other types of networks.

Furthermore, it is to be appreciated that the processing platform 1400 of FIG. 14 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1400 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the secure data pool framework environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
obtaining sensor data, at a gateway, generated by at least one sensor associated with a set of one or more sensors operatively coupled to the gateway, wherein the gateway and plurality of sensors are part of an operational technology environment;
generating at least one data object comprising the sensor data and metadata corresponding to the sensor data, wherein the metadata in the data object comprises data indicative of the ownership of the sensor data; and
sending the data object to a secure data pool for storage and for secure access by one or more clients, wherein the one or more clients are part of an information technology environment, to enable secure sharing of the sensor data from the operational technology environment with the information technology environment;
wherein the steps are performed by at least one processing device comprising a processor and a memory.

2. The method of claim 1, wherein the secure data pool is located local to the gateway.

3. The method of claim 1, wherein the secure data pool is located remote from the gateway.

4. The method of claim 1, wherein the data object comprises a grouping of readings from the at least one sensor.

5. The method of claim 1, wherein the metadata in the data object comprises data descriptive of the nature of the sensor data.

6. The method of claim 1, wherein the data indicative of the ownership of the sensor data comprises a decentralized identifier.

7. The method of claim 1, further comprising digitally signing the data object with a private cryptographic key of the owner of the sensor data prior to the data object being sent to the secure data pool for storage.

8. The method of claim 1, further comprising receiving a content address-based identifier from the secure data pool after storage therein.

9. The method of claim 8, further comprising registering the content address-based identifier in a distributed ledger.

10. The method of claim 1, further comprising:
obtaining sensor data generated by at least another sensor associated with the gateway or another gateway;
generating at least another data object comprising the sensor data and metadata corresponding to the sensor data; and
sending the at least another data object to the secure data pool for storage and for secure access by one or more clients.

11. The method of claim 1, wherein an application deployment layer is implemented on the secure data pool and configured to provide at least one application programming interface for a given client application program to access data stored in the secure data pool.

12. The method of claim 11, wherein the access to the data stored in the secure data pool enables simulated access.

13. The method of claim 1, further comprising generating provenance for the data object and storing the provenance in a distributed ledger prior to permitting access to the data object by the one or more clients.

14. The method of claim 1, further comprising advertising one or more attributes of the data object in a data marketplace.

15. The method of claim 14, further comprising receiving cryptocurrency in exchange for access to the data object.

16. An article of manufacture comprising a processor-readable storage medium having encoded therein executable code of one or more software programs, wherein the one or more software programs when executed by at least one processing device implement steps of:

obtaining sensor data, at a gateway, generated by at least one sensor associated with a set of one or more sensors operatively coupled to the gateway, wherein the gateway and plurality of sensors are part of an operational technology environment;
generating at least one data object comprising the sensor data and metadata corresponding to the sensor data, wherein the metadata in the data object comprises data indicative of the ownership of the sensor data; and
sending the data object to a secure data pool for storage and for secure access by one or more clients, wherein the one or more clients are part of an information technology environment, to enable secure sharing of the sensor data from the operational technology environment with the information technology environment.

17. The article of manufacture of claim 16, wherein the data indicative of the ownership of the sensor data comprises a decentralized identifier.

18. An apparatus comprising:
at least one processor operatively coupled to at least one memory configured to:
obtain sensor data, at a gateway, generated by at least one sensor associated with a set of one or more sensors operatively coupled to the gateway, wherein the gateway and plurality of sensors are part of an operational technology environment;
generate at least one data object comprising the sensor data and metadata corresponding to the sensor data, wherein the metadata in the data object comprises data indicative of the ownership of the sensor data; and
send the data object to a secure data pool for storage and for secure access by one or more clients, wherein the one or more clients are part of an information technology environment, to enable secure sharing of the sensor data from the operational technology environment with the information technology environment.

19. The apparatus of claim 18, wherein the data indicative of the ownership of the sensor data comprises a decentralized identifier.

20. The apparatus of claim 18, wherein an application deployment layer is implemented on the secure data pool and configured to provide at least one application programming interface for a given client application program to access data stored in the secure data pool.

* * * * *